Aug. 3, 1926.　　　　　　　　　　　　　　　　1,594,502
E. P. ELZEY
TRACTION PLATE FOR METAL WHEELS AND THE LIKE
Original Filed Dec. 29, 1923　　3 Sheets-Sheet 1

Witness:
Robert F. Beck

Inventor
E. P. Elzey
By Hubert E. Peck  Attorney

Aug. 3, 1926. 1,594,502
E. P. ELZEY
TRACTION PLATE FOR METAL WHEELS AND THE LIKE
Original Filed Dec. 29, 1923  3 Sheets-Sheet 2
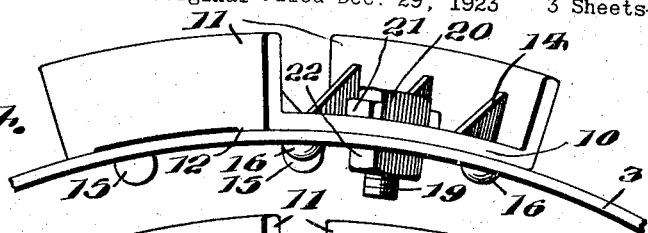
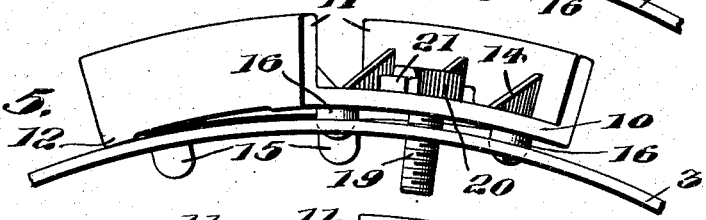
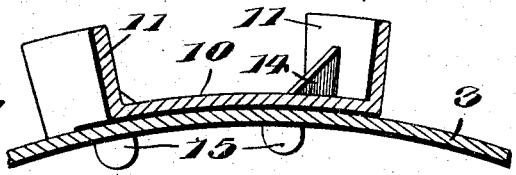
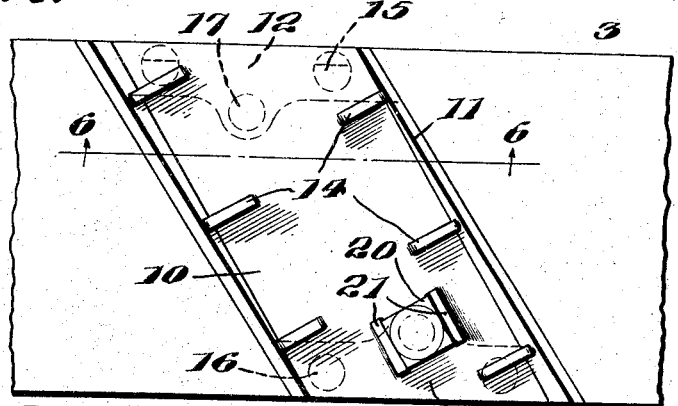
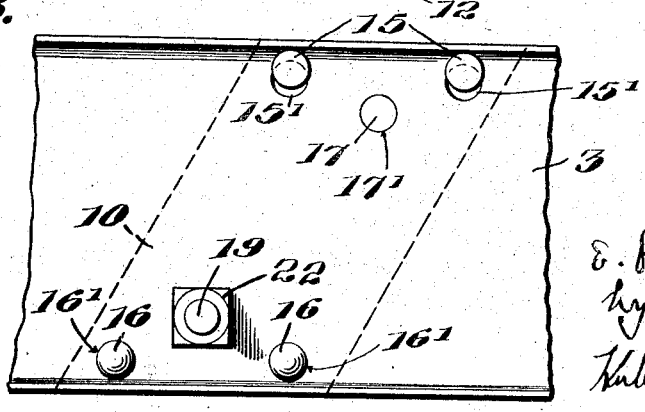
Inventor
E. P. Elzey
by
Attorney Aug. 3, 1926.
E. P. ELZEY
1,594,502
TRACTION PLATE FOR METAL WHEELS AND THE LIKE
Original Filed Dec. 29, 1923   3 Sheets-Sheet 3
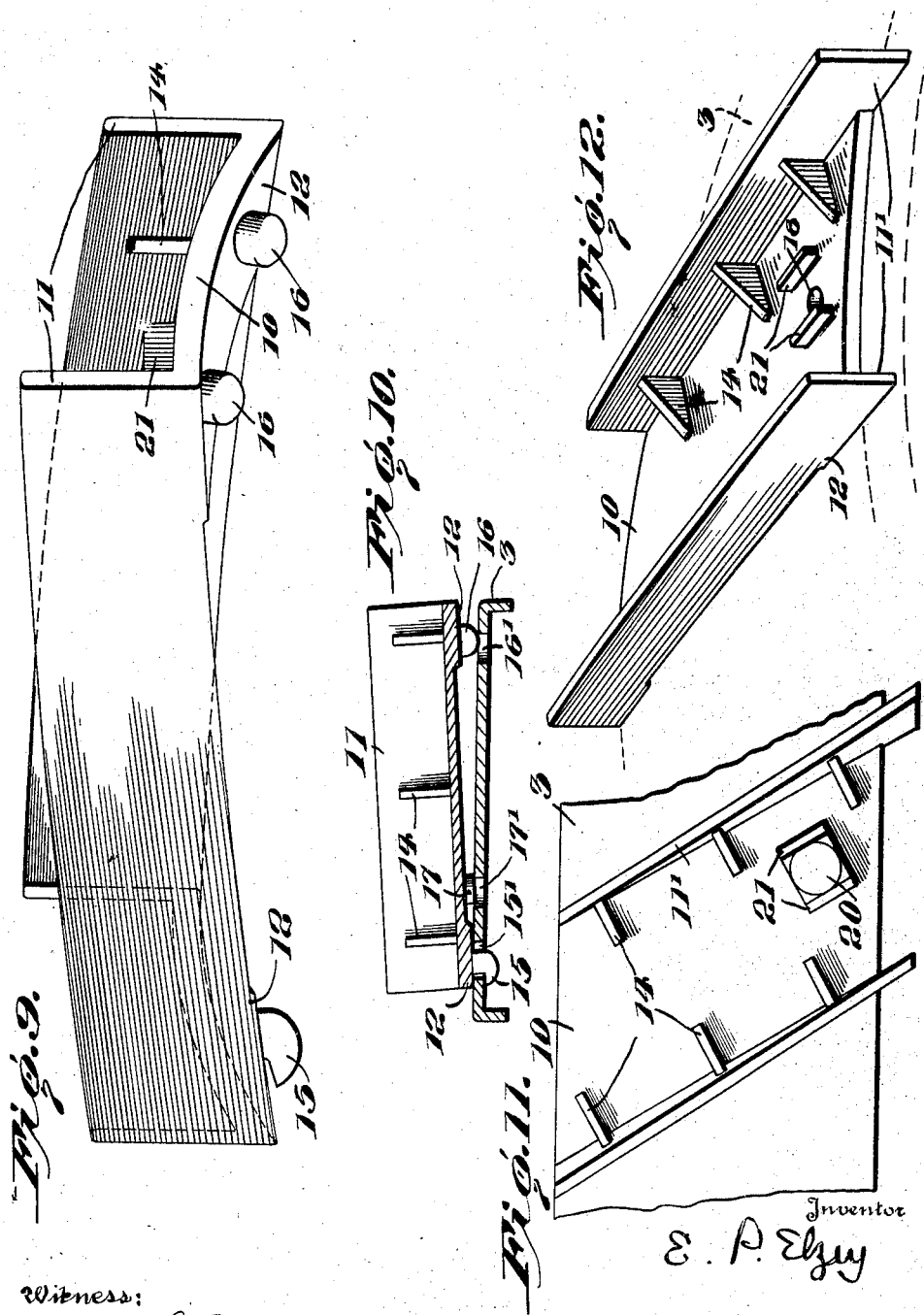

Patented Aug. 3, 1926.

1,594,502

UNITED STATES PATENT OFFICE.

EDGAR P. ELZEY, OF PARKERSBURG, WEST VIRGINIA.

TRACTION PLATE FOR METAL WHEELS AND THE LIKE.

Application filed December 29, 1923, Serial No. 683,411. Renewed December 28, 1925.

This invention relates to certain improvements in traction plates for metal wheels and the like; and the nature and objects of the invention will be readily recognized and understood by those skilled in the art in the light of the following explanation and detailed description of the accompanying drawings illustrating what I at present believe to be the preferred embodiments or mechanical expressions of the invention from among various other forms, arrangements, combinations and constructions of which the invention is capable within the spirit and scope thereof.

The invention is primarily directed to the solution of certain problems encountered in the mounting and use of traction plates and similar elements on the traction wheels of mobile power propelled machinery, such for example as tractors, and particularly when such power propelled machinery is equipped with traction wheels of the type having a broad or wide rim or tread for traversing and operating over soft surfaces such as presented by dirt roads, fields and the like. One form of traction element in universal use on traction wheels of the general type mentioned, consists of an angle plate which is secured to and extending across the rim or tread of a wheel by riveting or bolting one flange thereof to the rim, so that the other flange extends outwardly therefrom to provide the surface engaging and gripping member. A series of these angle traction plates are generally fixed on the tread or rim of a traction wheel at spaced intervals therearound and extending across the tread at an angle to the axis of the wheel, in such a manner that practically continuous traction or engagement of the outstanding flanges is secured during rotation of the wheel, as will be readily understood by those familiar with this type of traction plate.

However, in the operation and use of the single angle type of traction plate the outstanding flange thereof functions as a lever and it is found that the force exerted thereon by the power transmitted to the traction wheel tends and is frequently sufficient to "pull" or force the attached secured flange of the plate from the rim or tread of the wheel, working loose or shearing the bolts or rivets securing the flange to the rim. Further, where considerable power is applied to a traction wheel and the outstanding flange of a traction plate engages or encounters a hard non-yielding material such as stone or rock, the base flange may be bent or ripped from the wheel rim and the securing bolts or rivets pulled or sheared with resulting loosening or detachment of the traction plate. The foregoing conditions thus require the use of a plurality of bolts, rivets or the like to secure as strong and rigid a fastening as possible for each traction plate.

In the use of such power propelled machinery it is frequently necessary to traverse or operate over hard or finished roads and similar surfaces, so that where the traction wheels are equipped with traction plates or elements of the general character referred to, it is necessary or desirable to remove the same in order to prevent injury to or mutilation of such surfaces. With the type of single angle traction plate in general use it is exceedingly difficult and consumes considerable time to remove and apply a series or set of these traction plates from and to a traction wheel, due to the number of rivets, bolts or other fastening elements which are required to secure the same to the rim of a wheel. This disadvantage is further aggravated by the number of single angle traction plates or elements required around the rim or tread of a traction wheel to secure the desired substantially continuous traction, as will be readily understood.

Hence, one of the primary objects of the present invention is the provision of a traction element or unit of the plate type in which the tendency of the surface engaging and gripping members thereof to bend or twist, and to "pull," loosen, or shear the fastening or securing means therefor from the rim or tread, under the forces exerted thereon by the traction wheel, is practically eliminated.

A further object of the invention is to provide a traction element or unit of the plate type particularly adapted for application to and use with a traction wheel having a relatively wide rim or tread, which is so designed and formed as to permit of securing continuous traction for a wheel by the use of a minimum number of such traction units around the wheel rim or tread.

A further object of the invention is the provision of a traction unit of the plate type which is readily attached and detached to and from the rim or tread of a traction wheel and in which the number of detachable or removable securing elements or members, such as bolts or rivets, required to fasten and maintain a traction unit in position on the rim or tread of a wheel is reduced to a minimum.

A further object of the invention is to provide for detachably securing and mounting a traction element or unit of the plate type on the rim or tread of a traction wheel, without utilizing or requiring a multiplicity of bolts, rivets, or the like detachable securing members to maintain the traction element in mounted, attached position.

A further object of the invention is to provide as a detachable unit, a traction element of the plate type presenting a plurality of surface engaging and gripping members carried by a rim or tread engaging base which forms a strengthening and stress resisting structure for the surface engaging members of the unit.

A further object of the invention is the provision of a traction element or unit of the plate type adapted to be secured across the rim or tread of a traction wheel, which unit is of simple construction possessing a high strength factor and capable of manufacture at a relatively low cost.

With the foregoing and various other objects and results in view, which other objects and results will be readily apparent from the following explanation, the invention consists in certain novel features in construction and in combinations and arrangements of elements, as will be more fully and particularly referred to and specified hereinafter.

Referring to the accompanying drawings:—

Fig. 4 is a perspective view of a traction plate in mounted position on a rim taken from the outer end or side thereof.

Fig. 5 is a perspective view similar to Fig. 4, with the traction plate in position to be secured on and against the rim by the detachable fastening member.

Fig. 6 is a transverse section taken on the line 6—6 of Fig. 7.

Fig. 7 is a top plan of a traction plate in mounted position.

Fig. 8 is bottom plan of a portion of a wheel rim with a traction plate in mounted position.

Fig. 9 is a perspective view of a traction unit or plate of the invention.

Fig. 10 is a vertical longitudinal section taken through a traction plate and wheel rim with the plate in the position of Fig. 5.

Fig. 11 is a top plan of a modified form of traction unit or plate of the invention mounted on the rim of a traction wheel.

Fig. 12 is a perspective view of the form of Fig. 11.

The invention is particularly adapted for application to and use with metal traction wheels of the type having a relatively wide metal rim or tread for operation over soft surfaces such as dirt roads, fields and the like, and the embodiments of the invention illustrated in the accompanying drawings are of a form for use with such types of traction wheels. However, it is not desired to limit the invention to use with such types of wheels, as various features and elements of the invention are capable of application to and use with various other types and forms of traction wheels, as will be readily apparent to those familiar with this art. The illustrated embodiments and applications of the invention are presented by way of example and not of limitation, for purposes of clearly explaining and bringing forth the principles and features of the invention, as in the illustrated embodiments and the application and use thereof, the problems solved and the disadvantages overcome by the invention are encountered in an accentuated degree.

Figure 1:
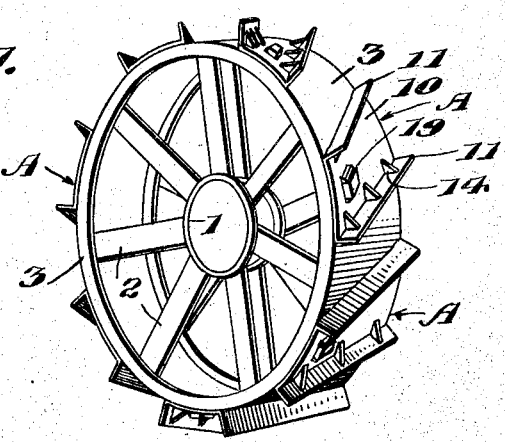
Fig. 1 is a perspective view of a metal traction wheel equipped with the traction units or plates of the invention.
Figure 2:
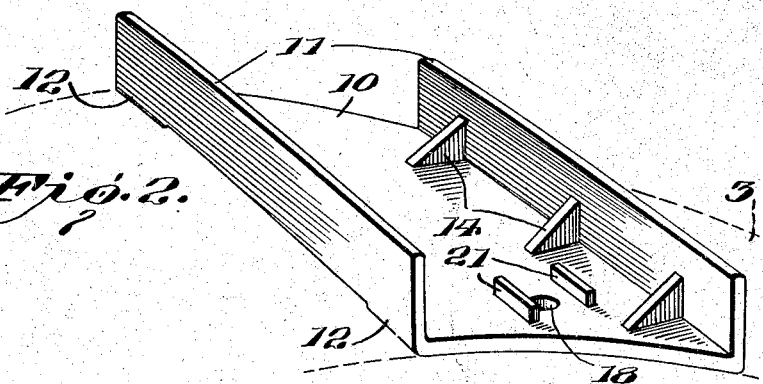
Fig. 2 is a perspective view of a traction plate of the invention in mounted position on a wheel rim, a portion of a rim being shown.

A well known and familiar type of metal traction wheel adapted for operation over dirt roads, fields and such like relatively soft surfaces, is illustrated in Fig. 1 of the drawings, as embodying a hub portion 1, spokes 2, and a relatively wide or tread forming portion 3, presenting a substantially smooth traction surface. In order to secure the successful operation of this type of traction wheel over soft surfaces such as presented by fields and the like, it is found necessary to provide surface engaging and gripping elements on and around the tread 3 of the wheel to develop the required positive traction. One well known method employed for obtaining positive traction for such types of wheels consists in securing a series of traction elements around the tread of a traction wheel at spaced intervals and at an angle to the axis of the wheel so as to secure practically continuous engagement of the elements with a surface during rotation of the wheel, and resulting continuous traction therefor, as will be familiar to those skilled in this art. A universally used form of such traction elements consists of a single angle plate riveted or bolted across the wheel tread with one flange forming a surface engaging member, as hereinbefore referred to. The present invention deals with the construction and mounting of this general type of traction element, and a series of traction elements or units A embodying the invention are shown in Fig. 1 of the drawings mounted on and around a traction wheel in the general manner referred to for securing substantially continuous traction.

According to the illustrated embodiments of the invention, a traction element or unit A, comprises a web or base plate 10 which is formed to fit upon and be secured to the rim or tread of a wheel, and the substantially parallel opposite side flanges 11 extending outwardly from one face and longitudinally of, the web or base plate 10 which extends between and connects the same. In the example illustrated the base plate or web 10 and the outwardly extending flanges 11 are formed from a single piece of material so that in effect the traction unit comprises a plate having the opposite longitudinal side portions bent or extended outwardly at an angle to the base 10 to provide the substantially parallel surface engaging and gripping members or flanges 11, the unit thus being approximately U-shape in cross section. Any desired or suitable material such for example as steel, may be utilized, and the traction elements or units A can be formed therefrom in any of a number of ways, as by casting, forging, or by other methods.

A traction element or unit A is adapted to be secured in mounted position on and extending across the rim or tread of a traction wheel at an angle to the axis of the wheel, as clearly shown in Fig. 1 of the drawings, with the spaced, substantially parallel flanges 11 thereof extending across and outwardly from the wheel to engage and grip a surface over which the wheel is operating. Due to the angle at which a unit A is mounted across the rim 3 for example, of a traction wheel, the flange connecting and base forming web 10 of each unit A is curved or shaped to substantially conform to the radius of the wheel rim at the angle at which mounted thereon, as will be clear by reference to the accompanying drawings and particularly Fig. 9 thereof. However, according to the invention, the curvature of the rim or tread engaging side of the base 10 of a unit A is made slightly less than the curvature of the rim over and on which it is mounted, so that the base does not fit down on and exactly conform to the curvature of the portion of the rim over which it extends, for a purpose explained hereinafter. The opposite, inner and outer, ends of the base 10 terminate along and at the inner and outer edges of the wheel rim in mounted position thereon, as shown in the drawings. The base or web 10 of a unit is formed on the under or tread face or surface with the opposite end raised or thickened portions or areas 12 which form the rim or tread engaging members and carry the means for securing and positioning a unit on a traction wheel, as will be described in detail hereinafter. On the outer or traction face of a unit A, a series of strengthening ribs, braces, or the like members 14 are formed extending between and connecting the inner sides of the traction flanges 11 and the base or web 10, the ribs 14 being disposed transversely of the base 10 and flanges 11 at spaced intervals along the length thereof, as particularly disclosed in Fig. 7 of the accompanying drawings. Preferably, as in the illustrated examples the strengthening ribs or braces 14 are formed integral with the base 10 and traction flanges 11, although the invention is not so limited.

Figure 3:
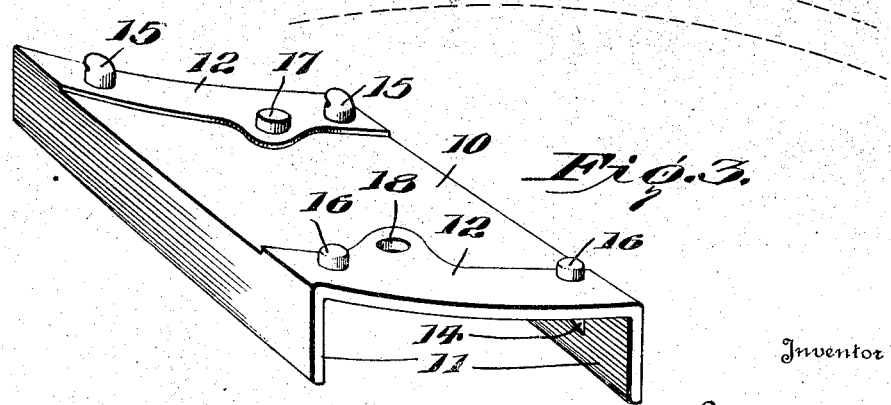
Fig. 3 is a perspective view showing particularly the under or rim engaging side of the base of a traction plate with the securing means therefor.

The invention provides for the detachable mounting and positioning of the traction units A on the rim or tread of a traction wheel, in such a manner that each unit A is firmly and rigidly maintained in mounted position on a wheel with the use of a single detachable securing member, and can be readily detached and attached from and to the wheel with a minimum expenditure of time and labor. The illustrated embodiments of this feature of the invention comprises a pair of hook studs 15 depending from the inner raised portion 12 adjacent the inner edge of the base 10 and extending inwardly therefrom, and a pair of straight rounded end lugs 16 similarly disposed depending from the outer raised portion 12 of the base 10 adjacent the outer edge thereof. A straight relatively short stud or lug 17 depends from and is disposed on the inner raised portion 12 intermediate and a distance inwardly from the spaced hook studs 15, and a bore or hole 18 is formed through the outer raised portion 12 intermediate and spaced inwardly from the studs 16. (See particularly Figs. 3 and 8 of the drawings.) An externally threaded detachable fastening and securing bolt 19 having a squared or flat sided head 20, is provided for mounting in and depending through the bore 18 at the outer side or end of a traction unit A, with the bolt head 20 on the outer or traction face of the base 10. Lugs 21 are disposed at opposite sides of the bolt hole 18 and extend upwardly from the base 10 to receive the bolt head 20 therebetween and prevent turning or rotation of bolt 19 in mounted position, as will be clear by reference to the drawings. A nut 22 shown in Fig. 4 of the drawings is provided for threading onto the lower depending portion of the bolt 19.

The rim or tread of a traction wheel to which the traction elements or units A of the invention are to be mounted, as for example the metal rim 3 of the traction wheel of Fig. 1, is provided at the required intervals therearound at which the units A are to be mounted, with suitable holes or bores therethrough to receive and cooperate with the foregoing arrangement of securing studs and detachable securing bolt 19. Referring particularly to Figs. 8 and 10 of the drawings, each portion of the wheel rim 3 over and across which a traction unit A is secured, is provided adjacent the inner edge thereof with the holes 15' of slightly larger diameter than that of the hook studs 15 which they are adapted to receive, and a hole 17' to receive the short stud 17 at the inner end of the traction unit. At the outer edge the rim 3 is provided with the holes 16' to receive the straight studs 16, and a bore (not specifically indicated) to receive and through which the bolt 19 extends, as will be readily understood. The series of stud and bolt receiving holes above mentioned are arranged and disposed at the proper intervals around the rim or tread 3 of the wheel to position the series of traction units A, respectively, at the required angle across and intervals therearound to secure practically continuous engagement and traction by the series of traction elements or units, as hereinbefore referred to and explained.

A traction element or unit A formed as above described is mounted on and attached to the rim or tread of a traction wheel, as for example the rim 3 of the traction wheel of Fig. 1 having the stud receiving bores formed therein, in the following manner. The hook studs 15 depending from the raised portion 12 at the inner end of the unit A are passed through the bores 15' at the inner side of the rim 3 and the unit assumes the position extending over and across the wheel rim at the desired angle, as shown in Fig. 10 of the drawings. The bores 15' are of a larger diameter than the shanks of the hook studs 15 which extend therethrough so that the hook studs 15 are capable of play in these bores. With the unit in the position shown in Fig. 10, it is forced or moved inwardly across the wheel rim until the studs 15 bear against the inner sides of the bores 15', in which position of the unit A the short lug 17 is alined with bore 17', the outer studs 16 are alined with the bores 16' at the outer side of rim 3, and the bolt bore 18 in the base 10 of the unit is alined with the bolt bore (not indicated) formed through the rim. However, as previously referred to the radius of curvature of the rim engaging side of base 10 is slightly less than the radius of curvature of the portion of the rim 3 over which a unit A extends, and in the above position of the unit the outer end portion thereof is sprung upwardly from and out of engagement with the wheel rim 3. This position of a traction unit A is disclosed in Fig. 5 of the drawings. The detachable securing bolt 19 is then extended downwardly through the bore 18 in the base 10 of the unit at the outer end thereof, through the alined bore in the rim 3 and depends a distance therebelow. The head 20 of the bolt 19 lies between and engages the spaced lugs 21 so that rotation of the bolt is prevented. With the bolt 19 in the foregoing mounted position, the securing nut 22 is applied to the free depending end thereof and is screwed upwardly thereon to position against the under side of the rim and draws the unit A tightly down onto the upper face of the rim with the inner and outer raised portions 12 of the base 10 bearing on the rim, and the stud 17, and studs 16 extending into the bores 16' and 17' in the rim 3, respectively alined therewith. (See particularly Figs. 4 to 8 of the drawings.) In this manner, a traction unit A is secured and maintained rigidly and tightly in position on the rim 3 under tension, and shaking, loosening or other movements of the unit are prevented by the studs of the base 10 in the respective bores therefor in the wheel rim, and by the securing of the unit in position under tension.

Attention is directed to the fact that each traction unit A of the invention is mounted and secured in position on the wheel rim by the use of a single detachable securing member, the bolt 19, and that this member is positioned at the outer side of each unit (outer side of the rim) where it is readily accessible in mounting and detaching a unit. To detach a unit it is only necessary to unscrew the nut 22 from bolt 19 and remove the unit from the wheel rim. This feature of the invention permits of a series of the traction units A being removed from a traction wheel, as where it is desired to operate over surfaces such as finished roads without mutilating the same, with a minimum of effort and time, and similarly a series can be readily and quickly mounted on a wheel.

Under certain operating conditions it is found desirable to extend the ground engaging and gripping flanges beyond the outer edge of a wheel rim. In Figs. 11 and 12 a traction unit A of the invention is disclosed in which the flanges 11' thereof are extended outwardly a distance beyond the wheel rim 3, the base 10 terminating at the outer edge of the rim as in the hereinbefore described embodiments.

In operation and use a series of the traction units A are mounted on and around the traction wheels of a power propelled vehicle, such as a tractor for example, at the proper angle and intervals thereon to secure practically continuous traction. The traction units A are made for right and left wheels, as the reverse angles are employed as will be readily understood, the units on each wheel being inclined forwardly toward the direction of rotation of the wheel on which mounted, for example the wheel of Fig. 1 is a right wheel and the units A are at an angle inclined forwardly thereon. In mounted position the flanges 11 of each unit A extend outwardly from the wheel rim and engage the surface over which the wheel is operating. The base or connecting web 10 between the flanges 11 forms a strengthening and stress resisting member for the flanges 11 and prevents bending, twisting or breakage of these flanges under the forces exerted thereon by the power applied to the traction wheel. The flanges 11 are further strengthened by the ribs 14 between the base 10 and these flanges, and the width of the base held rigidly under tension on and against the wheel rim prevents twisting and "pulling" of the units from position. Again, it will be noted that a series of the units *a* mounted and secured around the rim of a wheel will protect the rim and due to the relatively wide bases 10 will tend to strengthen the wheel rim.

By the provision of a single traction element or unit embodying and presenting a pair of surface engaging and gripping members or flanges, the number of units required around a wheel to secure the continuous traction desired, is maintained at a minimum, for example is reduced to approximately one-half the number of traction elements of the single angle type required for the same wheel. This results in a reduction in the time and labor required to apply or remove a set of traction elements from a wheel, as well as increasing the strength and efficiency of the traction units in operation, as will be readily understood.

Traction elements or units embodying the invention as hereinbefore described and explained can be readily manufactured at relatively small cost in any of a number of ways, as for example by steel castings, die castings or machine forgings, and can be furnished by the manufacturer of mobile power propelled machinery as equipment, as well as sold to users as accessories for application to and use with such machinery.

While in the embodiment of the invention illustrated and described herewith by way of example, the base or connecting web 10 is formed thickened at the ends to provide the raised portions 12 on the under or tread face thereof, the invention is not so limited, as if desired or found expedient the base plate 10 can be formed with an unbroken under or tread face.

It is evident that various changes, modifications, variations and substitutions might be resorted to without departing from the spirit and scope of my invention, and hence I do not desire to limit myself to the exact disclosures hereof.

What I claim is:—

1. A traction unit embodying a base, spaced surface engaging flanges extending outwardly from said base, and bracing ribs disposed substantially transversely of and extending between said flanges and the base, respectively, the said ribs forming additional surface engaging surfaces.

2. A traction unit for detachable mounting across the tread of a wheel at an angle thereto, embodying a base having a radius of curvature less than that of the portion of a wheel tread across which the base is to be mounted, surface engaging means on said base, and detachable securing means for forcing and maintaining said base under tension against the wheel tread.

3. In a traction element of the type adapted to be mounted across the tread of a wheel at an angle thereto, a base formed with slightly less curvature than the curvature of the portion of the wheel tread on and across which the base is to be mounted.

4. A traction unit embodying a base formed with spaced longitudinally disposed surface engaging flanges thereon extending outwardly therefrom, fixed wheel engaging means at one end of said base, and detachable means at the opposite end of said base for attaching and maintaining the unit in position on a wheel.

5. A traction unit embodying a base adapted to be mounted on and across the tread of a wheel, spaced surface engaging flanges extending outwardly from said base, fixed means at one end of said base for engaging the inner side of a wheel tread, and detachable securing means at the opposite end of the base adapted to engage and secure the base to the wheel rim and be accessible from the outer side of the wheel rim.

6. A traction unit embodying a base adapted to be mounted on and extending transversely across a wheel rim at an angle, spaced surface engaging or traction flanges extending outwardly from said base, studs at the inner end of said base for engaging a wheel rim, and a detachable securing member at the outer end of said base for securing the base in mounted position.

7. In a traction unit of the type adapted to be detachably mounted on and extending across the rim of a wheel, a base, hook studs at the inner end of the base adapted to engage the wheel rim, and a detachable securing member at the outer end of the base adapted to extend through and secure the base in position on the rim.

8. A traction unit of the type adapted to be detachably mounted on and across the rim or tread of a wheel, embodying a base, inwardly extending hook studs at the inner end of the base adapted to extend through and engage the wheel tread, tread engaging studs at the outer end of the base, and a detachable securing member at the outer end of the base adapted to extend through the wheel tread and secure the base in mounted position.

9. In combination with a traction wheel having a relatively wide tread, a traction unit mounted on and extending across the wheel tread, said unit embodying a base having spaced traction flanges disposed longitudinally and extending outwardly therefrom, hook studs at the inner end of said base extending through and capable of movement in bores formed at the inner side of the tread, fixed studs at the outer end of the base extending through bores in the outer side of the tread, said base and tread formed with alined bores therein, and a detachable securing member extending through said alined bores and binding the traction unit to the wheel tread.

10. As a new article of manufacture, a metal traction unit for metal rim traction wheels, embodying a substantially U-shape plate having the opposite legs thereof providing traction flanges and the web connecting said legs forming a base for mounting the unit on a wheel rim, strengthening ribs integral with said plate and extending between said web and the opposite legs, respectively for bracing the latter, and rim engaging lugs integral with and depending from the base forming web.

Signed at Parkersburg, Wood County, State of West Virginia, this 28th day of Dec., 1923.

EDGAR P. ELZEY.